United States Patent
Saigusa (10) Patent No.: US 10,332,403 B2
(45) Date of Patent: Jun. 25, 2019

(54) SYSTEM AND METHOD FOR VEHICLE CONGESTION ESTIMATION

(71) Applicant: Honda Motor Co., Ltd., Tokyo (JP)

(72) Inventor: Shigenobu Saigusa, West Bloomfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 15/679,068

(22) Filed: Aug. 16, 2017

(65) Prior Publication Data
US 2018/0190128 A1 Jul. 5, 2018

Related U.S. Application Data

(60) Provisional application No. 62/442,333, filed on Jan. 4, 2017.

(51) Int. Cl.
*G08G 1/00* (2006.01)
*B60W 30/16* (2012.01)
(Continued)

(52) U.S. Cl.
CPC ............ *G08G 1/22* (2013.01); *B60W 30/162* (2013.01); *B60W 30/165* (2013.01);
(Continued)

(58) Field of Classification Search
CPC .. B60W 30/162; B60W 30/165; B60W 40/04; B60W 2520/105; B60W 2550/308;
(Continued)

(56) References Cited

U.S. PATENT DOCUMENTS

| | | |
|---|---|---|
| 4,361,202 A | 11/1982 | Minovitch |
| 5,166,681 A | 11/1992 | Bottesch et al. |

(Continued)

FOREIGN PATENT DOCUMENTS

| | | |
|---|---|---|
| JP | H07334790 | 12/1995 |
| JP | 2000285395 | 10/2000 |

(Continued)

OTHER PUBLICATIONS

Tanida, Analysis of merging behavior at expressway merging sections; Proceedings of the 2016 International Conference on Traffic and Transport Psychology; Brisbane, Australia; Aug. 2-5, 2016, 2 pages.

(Continued)

*Primary Examiner* — Calvin Cheung
(74) *Attorney, Agent, or Firm* — Rankin, Hill & Clark LLP

(57) ABSTRACT

A system and method for controlling a host vehicle in a platoon of vehicles. The method includes receiving speed data of a leading vehicle from the leading vehicle via a vehicle communication network, and receiving speed data of a preceding vehicle from a sensor system of the host vehicle. The preceding vehicle is positioned immediately ahead of the host vehicle. The leading vehicle is positioned ahead of the host vehicle and the preceding vehicle. The method includes calculating a transfer function between the leading vehicle and the host vehicle and determining a string stability level of the platoon of vehicles based on the transfer function. The string stability level indicates a speed variation of the platoon of vehicles. Further, the method includes calculating a traffic congestion level based on the string stability level, and controlling a vehicle system of the host vehicle based on the traffic congestion level.

20 Claims, 4 Drawing Sheets

(51) Int. Cl.
*B60W 30/165* (2012.01)
*B60W 40/04* (2006.01)
*G05D 1/02* (2006.01)
*G08G 1/16* (2006.01)

(52) U.S. Cl.
CPC ........... *B60W 40/04* (2013.01); *G05D 1/0287* (2013.01); *B60W 2520/105* (2013.01); *B60W 2550/308* (2013.01); *B60W 2550/40* (2013.01); *B60W 2720/106* (2013.01); *G08G 1/163* (2013.01)

(58) Field of Classification Search
CPC ........ B60W 2550/40; B60W 2720/106; G08G 1/22; G08G 1/163; G05D 1/0287
See application file for complete search history.

(56) References Cited

U.S. PATENT DOCUMENTS

| | | | |
|---|---|---|---|
| 5,189,619 A | 2/1993 | Adachi et al. | |
| 5,229,941 A | 7/1993 | Hattori | |
| 5,428,544 A | 6/1995 | Shyu | |
| 5,777,451 A * | 7/1998 | Kobayashi | B61L 23/34 180/169 |
| 5,928,294 A | 7/1999 | Zelinkovsky | |
| 5,983,161 A | 11/1999 | Lemelson et al. | |
| 6,032,097 A * | 2/2000 | Iihoshi | G05D 1/0293 701/96 |
| 6,249,232 B1 | 6/2001 | Tamura et al. | |
| 6,278,360 B1 | 8/2001 | Yanagi | |
| 6,292,725 B1 | 9/2001 | Kageyama et al. | |
| 6,470,986 B2 | 10/2002 | Fuchs et al. | |
| 6,615,137 B2 | 9/2003 | Lutter et al. | |
| 6,650,252 B2 | 11/2003 | Miller, Jr. | |
| 6,681,157 B2 | 1/2004 | Kageyama | |
| 6,737,963 B2 | 5/2004 | Gutta et al. | |
| 6,765,495 B1 | 7/2004 | Dunning et al. | |
| 6,853,906 B1 | 2/2005 | Michi et al. | |
| 6,985,089 B2 | 1/2006 | Liu et al. | |
| 7,191,049 B2 | 3/2007 | Yajima | |
| 7,295,925 B2 | 11/2007 | Breed et al. | |
| 7,382,274 B1 | 6/2008 | Kermani et al. | |
| 7,383,121 B2 | 6/2008 | Shinada | |
| 7,471,212 B2 | 12/2008 | Krautter et al. | |
| 7,554,435 B2 | 6/2009 | Tengler et al. | |
| 7,617,041 B2 | 11/2009 | Sera | |
| 7,877,187 B2 | 1/2011 | Hori et al. | |
| 7,945,369 B2 | 5/2011 | Lindqvist et al. | |
| 7,990,286 B2 | 8/2011 | Shankwitz et al. | |
| 8,145,368 B2 | 3/2012 | Won et al. | |
| 8,204,678 B2 | 6/2012 | Matsuno | |
| 8,384,531 B2 | 2/2013 | Szczerba et al. | |
| 8,396,642 B2 | 3/2013 | Breuer | |
| 8,527,174 B2 | 9/2013 | Watanabe et al. | |
| 8,620,517 B2 | 12/2013 | Caveney et al. | |
| 8,788,134 B1 | 7/2014 | Litkouhi et al. | |
| 8,818,682 B1 | 8/2014 | Dolgov et al. | |
| 8,903,588 B2 | 12/2014 | Schüdderich et al. | |
| 8,942,864 B2 | 1/2015 | Nemoto | |
| 8,942,904 B2 | 1/2015 | Foerster et al. | |
| 8,948,995 B2 | 2/2015 | Pandita et al. | |
| 9,092,986 B2 | 7/2015 | Salomonsson et al. | |
| 9,403,436 B1 | 8/2016 | Yamada | |
| 9,576,483 B2 | 2/2017 | Maass | |
| 9,632,507 B1 * | 4/2017 | Korn | G05D 1/0293 |
| 9,799,224 B2 * | 10/2017 | Okamoto | G08G 1/22 |
| 9,977,430 B2 | 5/2018 | Shalev-Shwartz et al. | |
| 2003/0218564 A1 | 11/2003 | Tamatsu et al. | |
| 2004/0073356 A1 | 4/2004 | Craine | |
| 2005/0195383 A1 | 9/2005 | Breed et al. | |
| 2006/0162985 A1 | 7/2006 | Tanaka et al. | |
| 2006/0284760 A1 | 12/2006 | Natsume | |
| 2007/0096885 A1 | 5/2007 | Cheng et al. | |
| 2007/0135989 A1 | 6/2007 | Hengst | |
| 2007/0142995 A1 | 6/2007 | Wotlermann | |
| 2007/0159354 A1 | 7/2007 | Rosenberg | |
| 2007/0241874 A1 | 10/2007 | Okpysh et al. | |
| 2007/0276600 A1 | 11/2007 | King et al. | |
| 2010/0066562 A1 | 3/2010 | Stählin et al. | |
| 2010/0100324 A1 | 4/2010 | Caminiti et al. | |
| 2010/0214085 A1 | 8/2010 | Avery et al. | |
| 2010/0256852 A1 | 10/2010 | Mudalige | |
| 2011/0018737 A1 | 1/2011 | Hsu et al. | |
| 2011/0032119 A1 | 2/2011 | Pfeiffer et al. | |
| 2011/0109475 A1 | 5/2011 | Basnayake et al. | |
| 2011/0184605 A1 | 7/2011 | Neff | |
| 2012/0229302 A1 | 9/2012 | Sri-Jayantha | |
| 2012/0306634 A1 * | 12/2012 | Tsuda | B60Q 1/2611 340/425.5 |
| 2012/0310518 A1 | 12/2012 | Chen et al. | |
| 2013/0041567 A1 * | 2/2013 | Yamashiro | B60T 7/22 701/96 |
| 2013/0041576 A1 | 2/2013 | Switkes et al. | |
| 2013/0054127 A1 | 2/2013 | Yamashiro | |
| 2013/0057397 A1 | 3/2013 | Cutler et al. | |
| 2013/0060443 A1 | 3/2013 | Shida | |
| 2013/0116859 A1 | 5/2013 | Ihlenburg et al. | |
| 2013/0116861 A1 | 5/2013 | Nemoto | |
| 2013/0211624 A1 * | 8/2013 | Lind | G05D 1/0278 701/2 |
| 2014/0005906 A1 * | 1/2014 | Pandita | B60W 30/17 701/96 |
| 2014/0005908 A1 | 1/2014 | Kollberg et al. | |
| 2014/0236449 A1 * | 8/2014 | Horn | B60W 30/16 701/96 |
| 2014/0257665 A1 | 9/2014 | Kagerer et al. | |
| 2014/0278052 A1 | 9/2014 | Slavin et al. | |
| 2014/0309884 A1 | 10/2014 | Wolf | |
| 2014/0358414 A1 | 12/2014 | Ibrahim et al. | |
| 2015/0100192 A1 * | 4/2015 | Lee | G08G 1/22 701/23 |
| 2015/0130607 A1 | 5/2015 | MacArthur | |
| 2015/0194055 A1 | 7/2015 | Maass | |
| 2015/0199905 A1 | 7/2015 | Hayee et al. | |
| 2015/0258996 A1 | 9/2015 | Victor et al. | |
| 2015/0321699 A1 | 11/2015 | Rebhan et al. | |
| 2016/0091897 A1 | 3/2016 | Nilsson et al. | |
| 2016/0133130 A1 | 5/2016 | Grimm et al. | |
| 2016/0200318 A1 | 7/2016 | Parikh et al. | |
| 2017/0122841 A1 * | 5/2017 | Dudar | B60W 40/02 |
| 2018/0032082 A1 | 2/2018 | Shalev-Shwartz et al. | |

FOREIGN PATENT DOCUMENTS

| | | |
|---|---|---|
| JP | 2012083995 | 4/2012 |
| WO | WO1998/032030 | 7/1998 |

OTHER PUBLICATIONS

Office Action of U.S. Appl. No. 15/630,866 dated Dec. 14, 2017, 29 pages.
Office Action of U.S. Appl. No. 15/630,866, dated May 2, 2018; 19 pages.
Office Action of U.S. Appl. No. 15/630,864 dated Jan. 22, 2019, 46 pages.
Office Action of U.S. Appl. No. 15/191,358 dated Jan. 19, 2018, 19 pages.
Khan et al., Analyzing Cooperative Lane Change Models for Connected Vehicle, Information Systems and Machine Learning Lab, University of Hildesheim, Germany, 6 pages.
Office Action of U.S. Appl. No. 15/191,358 dated Sep. 26, 2017, 17 pages.
Office Action of U.S. Appl. No. 15/630,866, dated Oct. 4, 2018; 12 pages.
Mazda: Brake Assist and Electronic Brake Force Distribution; Active Safety Technology; 3 pages; http://www.mazda.com/en/innovation/technology/safety/active_safety/bk_ebd/; printed Nov. 10, 2017.

(56) References Cited

OTHER PUBLICATIONS

Office Action of U.S. Appl. No. 15/630,864 dated Apr. 2, 2019, 11 pages.

* cited by examiner

SYSTEM AND METHOD FOR VEHICLE CONGESTION ESTIMATION

RELATED APPLICATIONS

This application claims priority to U.S. Provisional Application Ser. No. 62/442,333 filed on Jan. 4, 2017, the entirety of which is expressly incorporated herein by reference.

BACKGROUND

Traffic congestion is an increasing problem in many transportation networks creating vehicle safety issues and driver frustration. In many cases, a driver of a host vehicle may be unaware of upcoming traffic congestion or unexpected and/or sudden traffic flow issues. Velocity disturbances in front of the host vehicle can propagate to the host vehicle and cause sudden stops, jerky turns, abrupt acceleration, or collisions.

With the increasing use of wireless vehicle communication, for example Vehicle-to-Vehicle (V2V), Vehicle-to-Infrastructure (V2I), and Vehicle-to-Everything (V2X) communication, information exchange can mitigate the effects of traffic congestion and velocity disturbances. In particular, this information can be used to anticipate traffic congestion, provide early warnings, and control driving functions (e.g., cooperative adaptive cruise control). In turn, the host vehicle can anticipate traffic flow disturbances and provide a comfortable and safe driving experience with smooth acceleration and braking.

BRIEF DESCRIPTION

According to one aspect, a computer-implemented method for controlling a host vehicle in relation to a leading vehicle, and a preceding vehicle, wherein the host vehicle, the leading vehicle, and the preceding vehicle are within a platoon of vehicles, includes receiving speed data of the leading vehicle from the leading vehicle via a vehicle communication network. The leading vehicle is positioned ahead of the host vehicle and the preceding vehicle. Further, the method includes receiving speed data of the preceding vehicle from a sensor system of the host vehicle. The preceding vehicle is positioned immediately ahead of the host vehicle. Further, the method includes calculating a transfer function between the leading vehicle and the host vehicle as a correlation between the speed data of the leading vehicle and the speed data of the preceding vehicle. The method includes determining a string stability level of the platoon of vehicles based on the transfer function. The string stability level indicates a speed variation of the platoon of vehicles. The method also includes calculating a traffic congestion level based on the string stability level, and controlling a vehicle system of the host vehicle based on the traffic congestion level.

According to another aspect, a vehicle control system for controlling a host vehicle in relation to a leading vehicle, and a preceding vehicle, wherein the host vehicle, the leading vehicle, and the preceding vehicle are within a platoon of vehicles, includes a wireless transceiver of the host vehicle to receive speed data of the leading vehicle from the leading vehicle via a vehicle communication network. The leading vehicle is positioned ahead of the host vehicle and the preceding vehicle. The system includes a sensor system of the host vehicle for sensing speed data of the preceding vehicle. The preceding vehicle is positioned immediately ahead of the host vehicle. The system includes a processor operatively connected for computer communication to the sensor system and the wireless transceiver. The processor calculates a transfer function between the leading vehicle and the host vehicle as a ratio between an input of the leading vehicle and an output of the preceding vehicle. The input of the leading vehicle is based on the speed data of the leading vehicle and the output of the preceding vehicle is based on the speed data of the preceding vehicle. The processor determines a string stability level based on the transfer function over a period of time. The processor calculates a traffic congestion level based on the string stability level and controls the host vehicle based on the traffic congestion level.

According to a further aspect, a non-transitory computer-readable storage medium for controlling a host vehicle in relation to a leading vehicle, and a preceding vehicle, wherein the host vehicle, the leading vehicle, and the preceding vehicle are within a platoon of vehicles, includes instructions. The instructions are executed by a processor and cause the processor to receive speed data of the leading vehicle from the leading vehicle via a vehicle communication network. The leading vehicle is positioned ahead of the host vehicle and the preceding vehicle. The processor receives speed data of the preceding vehicle from a sensor system of the host vehicle. The preceding vehicle is positioned immediately ahead of the host vehicle. The processor calculates a transfer function between the leading vehicle and the host vehicle as a correlation between the speed data of the leading vehicle and the speed data of the preceding vehicle. Further, the processor determines a string stability level of the platoon of vehicles based on the transfer function. The string stability level indicates a speed variation of the platoon of vehicles. The processor calculates a traffic congestion level based on the string stability level, and controls a vehicle system of the host vehicle based on the traffic congestion level.

DETAILED DESCRIPTION

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Figure 1:
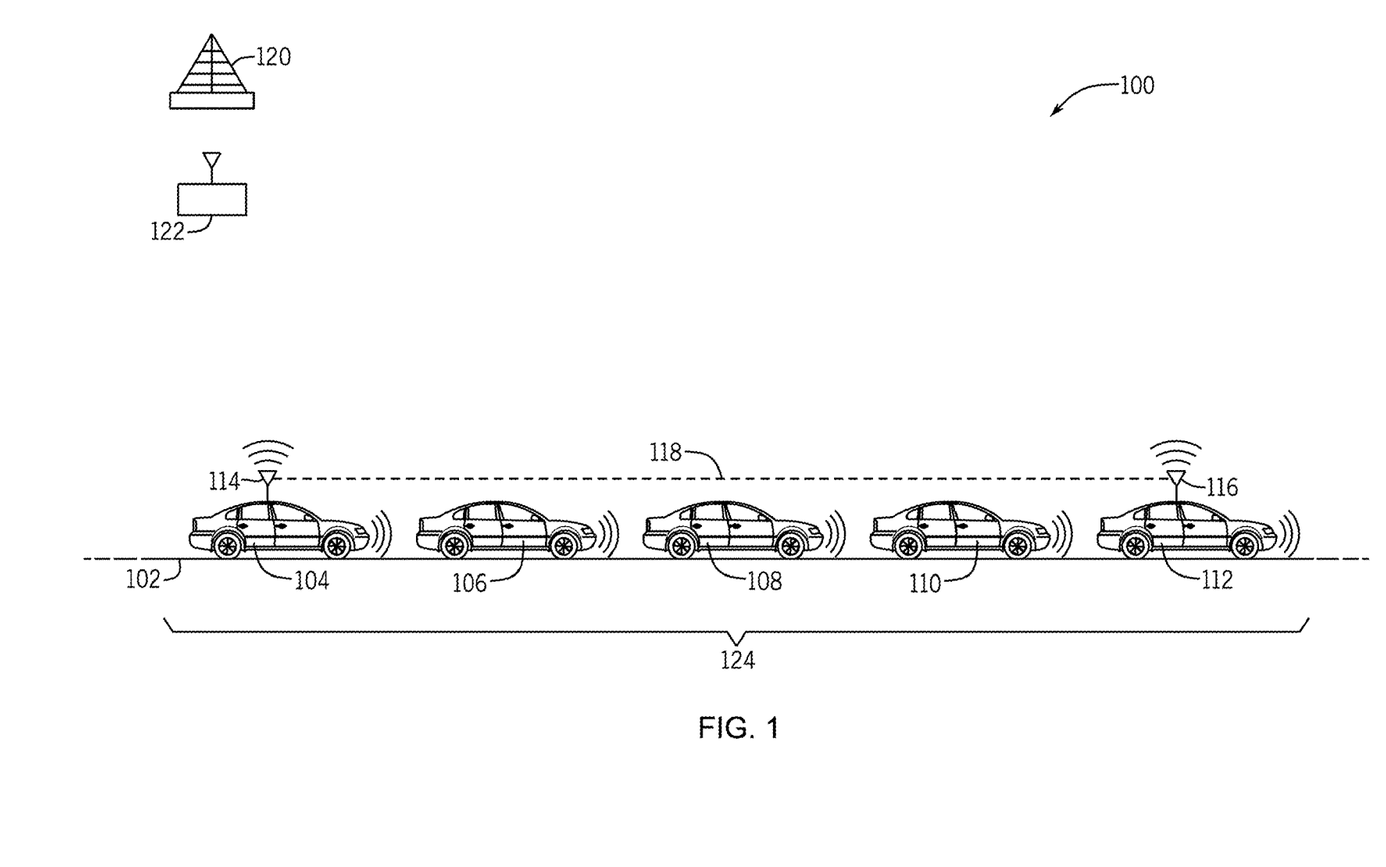
FIG. 1 is a is an exemplary traffic scenario using a vehicle communication network according to an exemplary embodiment.

The systems and methods described herein are generally directed to controlling a vehicle using a vehicle communication network that can include multiple vehicles and infrastructures. Communicating information using a vehicle communication network and/or sensing information about other vehicles allows for synergistic control of a host vehicle in the context of a traffic scenario, particular in areas having dense traffic congestion or other traffic flow issues. Thus, the methods and systems described herein provide traffic congestion estimation and cooperative adaptive cruise control (C-ACC) using a vehicle communication network. FIG. 1 illustrates an exemplary traffic scenario 100 using a vehicle communication network for traffic congestion estimation according to an exemplary embodiment. The traffic scenario 100 involves one or more vehicles on a roadway 102. In particular, a host vehicle (HV) 104, a preceding vehicle 106, an intervening vehicle 108, an intervening vehicle 110, and a leading vehicle 112 are shown travelling in the same lane on the roadway 102.

In some embodiments, vehicles located remotely from the host vehicle 104 (i.e., the preceding vehicle 106, an intervening vehicle 108, an intervening vehicle 110, and a leading vehicle 112) can be referred to as remote vehicles or a plurality of remote vehicles. In some embodiments, the host vehicle (HV) 104, the preceding vehicle 106, the intervening vehicle 108, the intervening vehicle 110, and the leading vehicle 112 are referred to as a platoon of vehicles, a fleet of vehicles, or a string of vehicles. As discussed herein, the platoon of vehicles will be referred to generally by element 124. It is understood that there can be any number of vehicles on the roadway 102 or within the platoon of vehicles 124. Further, in other embodiments, the roadway 102 can have different configurations and any number of lanes.

In FIG. 1, the preceding vehicle 106 is positioned immediately ahead of the host vehicle 104. The leading vehicle 112 is positioned ahead of the host vehicle 104, the preceding vehicle 106, the intervening vehicle 108, and the intervening vehicle 110. Thus, in FIG. 1, the leading vehicle 112 is at a foremost position of the platoon of vehicles 124. However, in other embodiments, the leading vehicle 112 can be another vehicle, for example, the intervening vehicle 110. Further, it is understood that there can be any number of intervening vehicles (e.g., more than two, less than two) between the preceding vehicle 106 and the leading vehicle 112.

Figure 2:
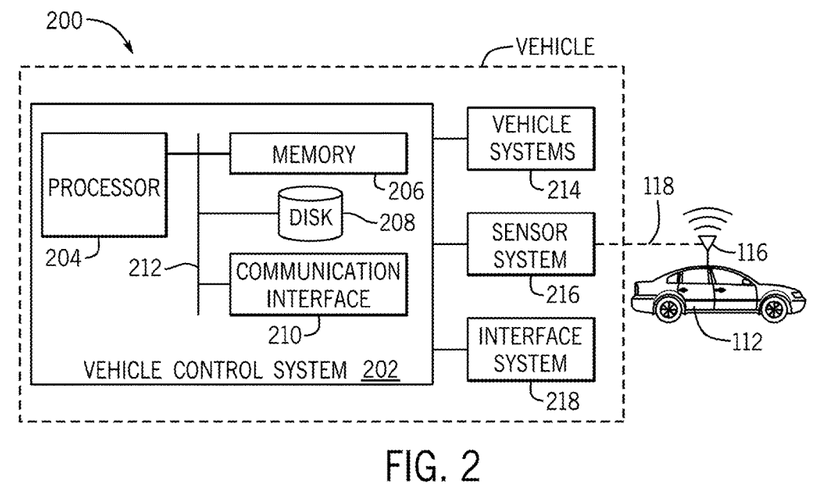
FIG. 2 is a block diagram of a vehicle control system of a vehicle according to an exemplary embodiment.

In the systems and methods discussed herein, the host vehicle 104 can be controlled, in part, based on data about one or more of the remote vehicles on the roadway 102 communicated via a vehicle communication network (See FIG. 2). In particular, the vehicle communication described herein can be implemented using Dedicated Short Range Communications (DSRC). However, it is understood that the vehicle communication described herein can be implemented with any communication or network protocol, for example, ad hoc networks, wireless access within the vehicle, cellular networks, Wi-Fi networks (e.g., IEEE 802.11), Bluetooth, WAVE, CALM, among others. Further, the vehicle communication network can be vehicle-to-vehicle (V2V), vehicle-to-infrastructure (V2I), or vehicle-to-everything (V2X).

In FIG. 1, the host vehicle 104 can transmit, receive, and/or exchange communications including data, messages, images, and/or other information with other vehicles, user, or infrastructures that are configured for DSRC communication. In particular, the host vehicle 104 is equipped with a vehicle-to-vehicle (V2V) transceiver 114 that can exchange messages and information with other vehicles, users, or infrastructures that are operable for computer communication (e.g., equipped for DSRC communication) with the host vehicle 104. In FIG. 1, the host vehicle 104 using the V2V transceiver 114 can communicate with the leading vehicle 112 via a V2V transceiver 116. As shown in FIG. 1, a communication link 118 is established between the host vehicle 104 and the leading vehicle 112 for V2V communication.

The platoon of vehicles 124 shown in FIG. 1 illustrate low DSRC penetration or a mixed condition because not every vehicle is equipped for V2V communication. In FIG. 1, only the host vehicle 104 and the leading vehicle 112 are equipped for V2V communication. Further, in FIG. 1, each vehicle is equipped with a sensor system (e.g., a radar system of a C-ACC or ACC system). It is understood that other configurations of V2V communication and sensing not shown in FIG. 1 can be implemented. However, in the embodiments discussed herein, V2V communication is only required between the host vehicle 104 and the leading vehicle 112. As V2V communication is introduced, there will likely be numerous vehicles (e.g., older vehicles) without V2V capability. Accordingly, the embodiments discussed herein work in low penetration conditions where not every vehicle is in communication with each other.

In FIG. 1, the host vehicle 104 using the V2V transceiver 114 can also communicate with a wireless network antenna 120 and/or a roadside equipment (RSE) 122. Similarly, the leading vehicle 112 via the V2V transceiver 116 can also communicate with the wireless network antenna 120 and/or the RSE 122. Although not shown in FIG. 1, the vehicle communication network can include other wireless communication networks, receivers, servers, and/or providers that can be accessed by the host vehicle 104 or the leading vehicle 112.

Referring now to FIG. 2, a block diagram of a vehicle control system 202 operable within a vehicle communication network 200. The vehicle control system 202 is operable for V2V communication with the leading vehicle 112 via the communication link 118. The vehicle control system 202 will be described with respect to the host vehicle 104, however, some or all of the components and functionalities described with the vehicle shown in FIG. 2 can be implemented with the leading vehicle 112. Similarly, some or all of the components and functionalities described with the vehicle shown in FIG. 2 can be implemented with the preceding vehicle 106, the intervening vehicle 108, the intervening vehicle 110, or any other vehicle. Additionally, in some embodiments discussed herein, the vehicle control system 202 will be referred to as a C-ACC control system 202. Other C-ACC systems associated with some vehicles may include different elements and/or arrangements, but can be configured to communicate over the vehicle communication network 200 with one or more other C-ACC systems or vehicle control systems. Further, in some embodiments, the vehicle control system 202 can be associated with another type of vehicle system or can be a general vehicle computing device that facilitates the functions described herein.

The vehicle control system 202 includes a processor 204, a memory 206, a disk 208, and a communication interface 210, each of which can be operably connected for computer communication, via for example, a bus 212. The processor 204 can include logic circuitry (not shown) with hardware, firmware, and software architecture frameworks for facilitating traffic congestion estimation. Thus, in some embodiments, the processor 204 can store application frameworks, kernels, libraries, drivers, application program interfaces, among others, to execute and control hardware and functions discussed herein. In some embodiments, the memory 206 and/or the disk 208 can store similar components as the processor 204 for execution by the processor 204. For example, in some embodiments, the processor 204 and/or the memory 206 can include instructions to be executed directly (such as machine code) or indirectly (such as scripts) by the processor 204. For example, the instructions may be stored as computer code on the computer-readable medium. In this regard, the terms "instructions" and "programs" may be used interchangeably herein. The instructions may be stored in object code format for direct processing by the processor 204, or in any other computer language including scripts or collections of independent source code modules that are interpreted on demand or compiled in advance. The disk 208 can store data that can be retrieved, modified, or stored by the processor 204.

The communication interface 210 can include software and hardware to facilitate data input and output between the components of the vehicle control system 202 and other components and/or other vehicles discussed herein. For example, as discussed above, the communication interface 210 can include the V2V transceiver 114 that can communicate with compatible DSRC transceivers in the vehicle communication network 200 via the communication link 118.

The vehicle control system 202 can also communicate with vehicle systems 214, a sensor system 216, and an interface system 218 (e.g., via the bus 212). As will be discussed herein, the vehicle control system 202 can be one of the vehicle systems 214. For example, in some embodiments, the C-ACC control system 202 is a type of vehicle system 214. The vehicle systems 214 can include, but are not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

The sensor system 216 includes various vehicle sensors that sense and/or measure data internally and/or externally from the host vehicle 104. More specifically, the sensor system 216 can include vehicle sensors for sensing and measuring a stimulus (e.g., a signal, a property, a measurement, and a quantity) associated with the host vehicle 104 and/or a particular vehicle system of the host vehicle 104. In some embodiments, the vehicle sensors are for sensing and measuring a stimulus associated with a vehicle and/or an object in proximity to the host vehicle 104. In particular, the sensor system 216 can collect data for identification and tracking the movement of traffic entities, for example, the preceding vehicle 106.

It is understood that the sensor system 216 can include any type of vehicle sensors used in any vehicle system for detecting and/or sensing a parameter of that system. Exemplary vehicle sensors include, but are not limited to accel-eration sensors, speed sensors, braking sensors, proximity sensors, vision sensors, seat sensors, seat-belt sensors, door sensors, environmental sensors, yaw rate sensors, steering sensors, GPS sensors, among others. It is also understood that the vehicle sensors can be any type of sensor, for example, acoustic, electric, environmental, optical, imaging, light, pressure, force, thermal, temperature, proximity, among others. The vehicle sensors could be disposed in one or more portions of the host vehicle 104. For example, the vehicle sensors could be integrated into a dashboard, seat, seat belt, door, dashboard, steering wheel, center console, roof or any other portion of the host vehicle 104. In other cases, however, the vehicle sensors could be portable sensors worn by a driver (not shown), integrated into a portable device (not shown) carried by the driver, integrated into an article of clothing (not shown) worn by the driver or integrated into the body of the driver (e.g. an implant).

In one embodiment, the sensor system 216 includes a front long-range radar and/or a front mid-range radar. For example, in FIG. 1, all of the vehicles on the roadway 102 have front long-range radar capabilities, as indicated by the lines emanating from the front of each vehicle. The front long-range radar can measure distance (e.g., lateral, longitudinal) and speed of objects surrounding the host vehicle 104. For example, the front long-range radar can measure distance and speed of the preceding vehicle 106. In some embodiments, the sensor system 216 can include a plurality of radars in different location of the host vehicle 104 (not shown). For example, a front left radar located at a front left corner area of the host vehicle 104, a front right radar located at a front right corner area of the host vehicle 104, a rear left radar located at a rear left corner area of the host vehicle 104, and a rear right radar located at a rear right corner area of the host vehicle 104.

Further, the host vehicle 104 includes an interface system 218 that can be used to receive input from a user (e.g., a driver, a vehicle occupant) and/or provide feedback to the user. Accordingly, the interface system 218 can include a display portion and an input portion. In some embodiments, the interface system 218 is a human machine interface (HMI) and/or a heads-up display (HUD) located in the host vehicle 104. The interface system 218 can receive one or more user inputs from one or more users. The input portion of the interface system 218 may enable a user, such as a driver or vehicle occupant, to interact with or provide input, such as user input, gestures, clicks, points, selections, voice commands, etc. the host vehicle 104 and/or the vehicle control system 202. For example, in some embodiments, a user can enable the vehicle control system 202 and/or control features of the vehicle control system 202 by interacting with the interface system 218.

As an example, the input portion of the interface system 218 can be implemented as a vehicle display, a touch screen, a touchpad, a track pad, one or more hardware buttons (e.g., on a radio or a steering wheel), one or more buttons, such as one or more soft buttons, one or more software buttons, one or more interactive buttons, one or more switches, a keypad, a microphone, one or more sensors, etc. In one or more embodiments, the interface system 218 can be implemented in a manner that integrates a display portion such that the interface system 218 both provides an output (e.g., renders content as the display portion) and receives inputs (e.g., user inputs). Other examples of input portions may include a microphone for capturing voice input from a user.

The interface system 218 can display information (e.g., graphics, warnings, and notifications). For example, the vehicle control system 202 can generate information, suggestions, warnings, and/or alerts and provide the same to a vehicle operator on a display device (e.g., display portion) of the interface system 218. The information, warnings, etc., can include, but are not limited to, one or more navigation maps, symbols, icons, graphics, colors, images, photographs, videos, text, audible information, among others. The interface system 218 can also include other systems that provide visual, audible, and/or tactile/haptic feedback to a user. For example, an active force pedal (AFP) can be included as part of an acceleration pedal (not shown) in the host vehicle 104 to provide active feedback force to a driver's foot as the driver pushes the acceleration pedal.

As mentioned above, in some embodiments, the systems and methods discussed herein control the host vehicle 104 using data about the preceding vehicle 106, and data about the leading vehicle 112. More specifically, in one embodiment, the C-ACC control system 202 can receive the data from the leading vehicle 112 via the vehicle communication network 200, and can receive data about the preceding vehicle 106 using the sensor system 216 (e.g., radar sensors) on-board the host vehicle 104. Fusion and analysis of this data can be used to control the host vehicle 104 thereby allowing the host vehicle 104 to preemptively react to traffic disturbances that may affect the operation or the travel path of the host vehicle 104. Exemplary control by the C-ACC control system 202 will now be described in detail.

In some of the embodiments discussed herein, motion of the host vehicle 104 can be controlled, for example, by the C-ACC control system 202. In particular, the C-ACC control system 202 can control longitudinal motion of the host vehicle 104 using the data discussed above. For example, the C-ACC control system 202 can control acceleration and/or deceleration by generating an acceleration control rate and/or modifying a current acceleration control rate (e.g., a target acceleration rate). In other embodiments, the C-ACC control system 202 can control the interface system 218 to provide feedback and warnings.

Figure 3:
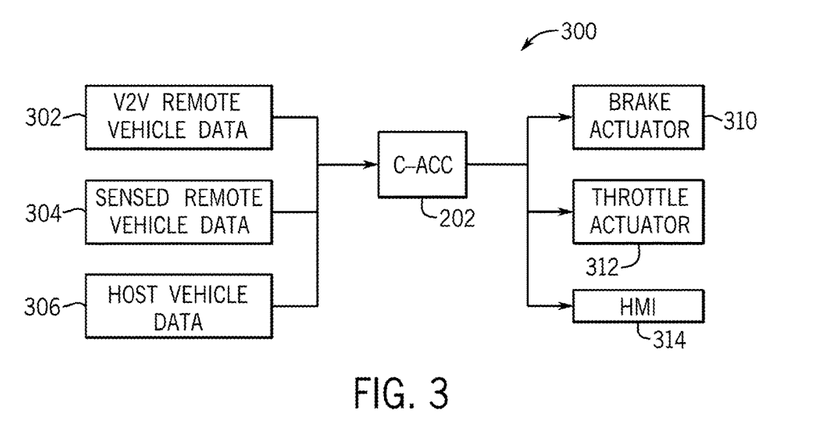
FIG. 3 is a schematic view of a C-ACC control model for controlling a vehicle control system according to an exemplary embodiment.

Referring now to FIG. 3, a schematic C-ACC control model 300 for controlling the host vehicle 104 is shown. FIG. 3 will be described with reference to the components of FIGS. 1-2. The control model 300 receives as inputs V2V remote vehicle data 302, sensed remote vehicle data 304, and host vehicle data 306. The V2V remote vehicle data 302 includes remote vehicle dynamics data about one or more remote vehicles communicated via the vehicle communication network 200. More specifically, in one embodiment, the V2V remote vehicle data 302 can include data received from the leading vehicle 112. The V2V remote vehicle data 302 can include speed, acceleration, velocity, yaw rate, steering angle, and throttle angle, range or distance data, among others, about the remote vehicle. The V2V remote vehicle data 302 can also include course heading data, course history data, projected course data, kinematic data, current vehicle position data, and any other vehicle information about the remote vehicle that transmitted the V2V remote vehicle data.

The sensed remote vehicle data 304 can include data about one or more of remote vehicles and/or other objects in proximity to the host vehicle 104 received and/or sensed by the sensor system 216. More specifically, in one embodiment, the sensed remote vehicle data 304 can include data sensed by the host vehicle 104 about the preceding vehicle 106. The sensed remote vehicle data 304 can also include vehicle data obtained from a radar system (e.g., the sensor system 216) including proximity data. For example, the sensed remote vehicle data 304 can include distance and speed of one or more of the remote vehicles surrounding the host vehicle 104, for example, the preceding vehicle 106.

The host vehicle data 306 includes vehicle dynamics data about the host vehicle 104. For example, speed, acceleration, velocity, yaw rate, steering angle, throttle angle, range or distance data, among others. The host vehicle data 306 can be accessed from the sensor system 216 via the bus 212. The host vehicle data 306 can also include status information about different vehicle systems 214. For example, the host vehicle data 306 can include turn signal status, course heading data, course history data, projected course data, kinematic data, current vehicle position data, and any other vehicle information about the host vehicle 104 and/or the vehicle systems 214.

The V2V remote vehicle data 302, the sensed remote vehicle data 304, and the host vehicle data 306 can be input to the C-ACC control system 202 and processed using methods which will be described in further detail herein. The C-ACC control system 202 can output acceleration and/or deceleration commands (e.g., via the processor 204) to execute said commands to the respective vehicle systems 214. For example, a brake actuator 310 and a throttle actuator 312 can be part of the vehicle systems 214 (e.g., a braking system). The HMI 314 can be part of the interface system 218. As an illustrative example, the C-ACC control system 202 can generate an acceleration control rate, which can be a target acceleration rate for the host vehicle 104. Based on the current acceleration rate of the host vehicle 104, the C-ACC control system 202 can generate a control signal to achieve the acceleration control rate. The control signal can be sent to the brake actuator 310 and/or the throttle actuator 312 for execution according to the control signal.

Additionally, the C-ACC control system 202 can execute commands to the HMI 314 (e.g., the interface system 218). For example, based on the V2V remote vehicle data 302, the sensed remote vehicle data 304, and the host vehicle data 306, visual, audible and/or tactile feedback can be generated and provided via the HMI 314. Accordingly, the host vehicle 104 is controlled based on the fusion of V2V remote vehicle data 302, the sensed remote vehicle data 304, and the host vehicle data 306 in accordance with methods, which will now be described in further detail.

Figure 4:
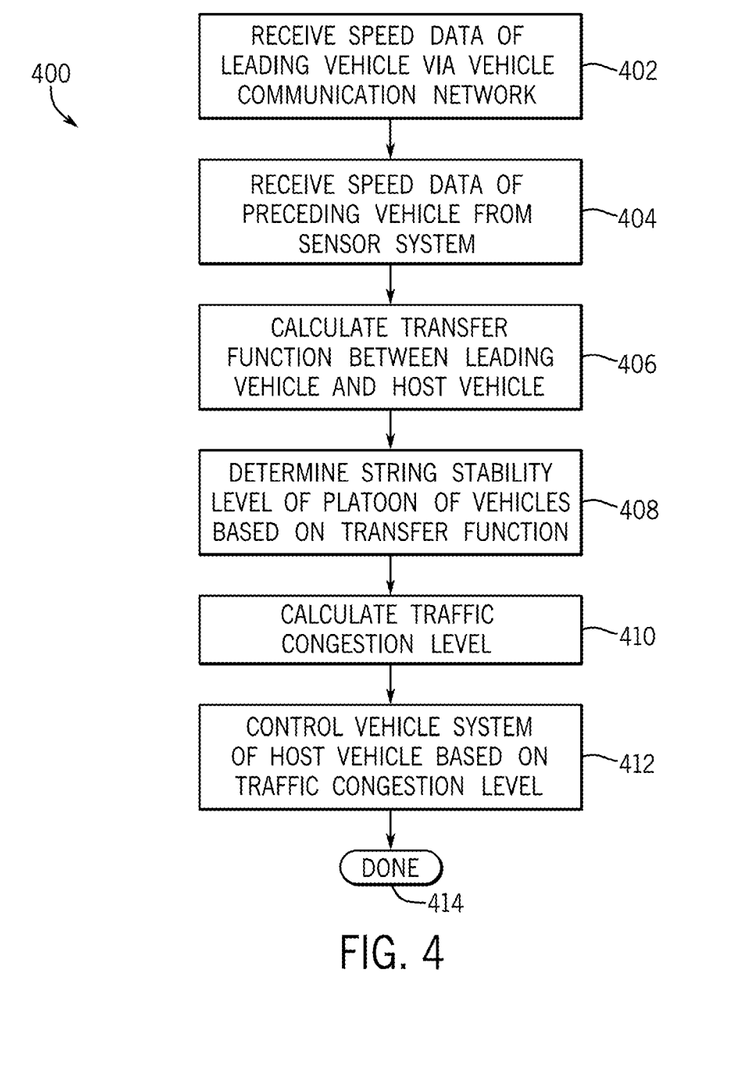
FIG. 4 is a process flow diagram of a method for controlling a host vehicle including congestion estimation according to an exemplary embodiment.

Referring now to FIG. 4, a process flow diagram of a method 400 for controlling the host vehicle 104 including congestion estimation according to an exemplary embodiment is shown. FIG. 4 will be described with reference to FIGS. 1-3. Generally, the method 400 is for controlling the host vehicle 104 in relation to the leading vehicle 112, and the preceding vehicle 106. As discussed above with FIG. 1, the preceding vehicle 106 is positioned immediately in front of the host vehicle 104. The leading vehicle 112 is positioned ahead of the host vehicle 104 and the preceding vehicle 106. In the embodiments discussed herein, the host vehicle 104, the preceding vehicle 106, and the leading vehicle 112 are part of a platoon of vehicles 124. The platoon of vehicles 124 in FIG. 1 includes the host vehicle 104, the preceding vehicle 106, an intervening vehicle 108, an intervening vehicle 110, and the leading vehicle 112. Thus, in some embodiments, the leading vehicle 112 is at the foremost position of the platoon of vehicles 124. Further, as discussed above with FIG. 1, the platoon of vehicles 124 has a low penetration of V2V communication capability. Said differently, some vehicles in the platoon of vehicles 124 are not equipped for V2V communication (e.g., the intervening vehicle 108 and the intervening vehicle 110).

Referring back to FIG. 4, in one embodiment at block 402, the method 400 includes receiving speed data of the leading vehicle 112 from the leading vehicle 112 via the vehicle communication network 200. For example, the host vehicle 104 using the V2V transceiver 114 can receive speed data (e.g., V2V remote vehicle data 302) from the leading vehicle 112 using the V2V transceiver 116. To facilitate communication, the communication link 118 is established between the host vehicle 104 and the leading vehicle 112. The communication link 118 can be established between V2V transceivers. For example, the V2V transceiver 114 can continuously search for signals from other V2V transceivers, such as by emitting a periodic signal that searches for a reply. In other embodiments, the V2V transceiver 114 may emit periodic signals searching for a reply from an in-range V2V transceiver. If a V2V transceiver replies, then a communications link may be established.

As discussed above with FIG. 3, the host vehicle 104 can receive (e.g., using the processor 204) V2V remote vehicle data 302 from the leading vehicle 112. This can include speed data, for example, a velocity of the leading vehicle 112 and/or an acceleration of the leading vehicle 112. In some embodiments the V2V remote vehicle data 302 is contained in a message packet transmitted from the leading vehicle 112. For example, the message packet can be in a Basic Safety Message (BSM) format as defined for DSRC standards. Vehicles can periodically broadcast BSMs to announce their position, velocity, and other attributes to other vehicles. Information and data received by the host vehicle 104 can be saved to memory 206 and/or the disk 208 and processed by the processor 204.

Referring again to FIG. 4, at block 404 the method 400 can include receiving speed data of the preceding vehicle 106 from the sensor system 216 of the host vehicle 104. Thus, as discussed above with FIG. 3, the host vehicle 104 can receive (e.g., via the processor 204) sensed remote vehicle data 304 about the preceding vehicle 106 from the sensor system 216. The sensed remote vehicle data 304 can include speed data. For example, the sensed remote vehicle data 304 can include a velocity of the preceding vehicle 106 and/or an acceleration of the preceding vehicle 106. In other embodiments, the sensed remote vehicle data 304 can includes a distance between the host vehicle 104 and the preceding vehicle 106. It is understood that in some embodiments, at block 404 the method 400 can include accessing host vehicle data 306 from the host vehicle 104, for example, from the sensor system 216.

At block 406, the method 400 includes calculating a transfer function between the leading vehicle 112 and the host vehicle 104. In one embodiment, the processor 204 can calculate the transfer function between the leading vehicle 112 and the host vehicle 104. The transfer function can be based on the speed data of the leading vehicle 112, the speed data of the preceding vehicle 106, and the host vehicle data 306. The transfer function can estimate propagation of disturbances (e.g., velocity disturbances) from the leading vehicle 112 to the host vehicle 104 based only on the speed data received via DSRC from the leading vehicle 112 and the speed data (e.g., radar data from the sensor system 216) sensed from the preceding vehicle 106. Thus, speed variances between vehicles not equipped for V2V communication in the platoon of vehicles 124 are ignored. In one embodiment, the transfer function is express mathematically as:

$$G_{HV} = \frac{V_{PV}}{V_{LV}} \tag{1}$$

where $V_{PV}$ is a velocity of the preceding vehicle 106 and $V_{LV}$ is a velocity of the leading vehicle 112. Thus, according to one embodiment, the transfer function is a correlation between the speed data of the leading vehicle 112 and the speed data of the preceding vehicle 106. In one embodiment, as described with equation (1), the transfer function is a correlation between the velocity of the leading vehicle 112 and the velocity of the preceding vehicle 106. In another embodiment, the transfer function is a correlation between the acceleration of the leading vehicle 112 and the acceleration of the preceding vehicle 106.

In another embodiment, the transfer function can be a ratio between an input of the leading vehicle 112 and the output of the preceding vehicle 106. The input of the leading vehicle 112 can be based on the speed data of the leading vehicle 112, and the output of the preceding vehicle 106 can be based on the speed data of the preceding vehicle 106. In one embodiment, as described with equation (1), the transfer function is a ratio between a velocity of the leading vehicle 112 and a velocity of the preceding vehicle 106. In another embodiment, the transfer function is a ratio between the acceleration of the leading vehicle 112 and the acceleration of the preceding vehicle 106.

Accordingly, the transfer function can estimate speed disturbances in the platoon of vehicles 124 that can affect the host vehicle 104 based on the speed data sensed from the preceding vehicle 106 and the speed data from the leading vehicle 112. Over time, patterns between the preceding vehicle 106 and the leading vehicle can be identified. Said differently, the input of the leading vehicle 112 that causes the output of the preceding vehicle 106 can be analyzed over time for speed disturbances. For example, if the leading vehicle 112 abruptly decelerates (e.g., the input), this speed variance will cause a behavior in the preceding vehicle 106, for example deceleration (e.g., the output). Thus, in one embodiment, the transfer function can be calculated over a period of time. Accordingly, equation (1) can also be expressed as a time series of real values, for example:

$$G_i = (G_{HV_1} \ldots G_{HV_N}) \qquad (2)$$

Based on the above, and with reference again to FIG. 4, at block 408 the method 400 includes determining a string stability level of the platoon of vehicles 124 based on the transfer function. In one embodiment, the string stability level indicates a speed variation of the platoon of vehicles 124. The term "string stability level" as used throughout this detailed description and in the claims refers to any numerical or other kind of value for distinguishing between two or more states of the stability of the vehicles in the platoon of vehicles 124 (e.g., a string of vehicles). For example, in some cases, the string stability level is associated with a given discrete state, such as "unstable", "slightly unstable", and "stable." In other cases, the string stability level could be given as a percentage between 0% and 100% or a value in the range between 1 and 10. In the embodiments discussed herein, the string stability level can be a variable stored at the memory 206 and/or the disk 208 that is set to a value as determined by the processor 204 for use with the methods and systems discussed herein.

In one embodiment, the processor 204 determines the string stability level based on the transfer function over the period of time. In particular, the transfer function is evaluated to determine a string stability level of unstable or a string stability level of stable. According to one embodiment, determining the string stability level can be expressed mathematically as:

$$|G_{i,i-1}|_\infty > 1 \qquad (3)$$

$$|G_{i,i-1}|_\infty \leq 1 \qquad (4)$$

If the transfer function is greater than one as shown in equation (3), the string stability level is set to unstable. If the transfer function is less than or equal to one as shown in equation (4), the string stability level is set to stable.

At block 410, the method 400 includes calculating a traffic congestion level based on the string stability level. Similar to the string stability level discussed above, the term "traffic congestion level" as used throughout this detailed description and in the claims refers to any numerical or other kind of value for distinguishing between two or more states of the traffic congestion in a platoon of vehicles 124 (e.g., a string of vehicles). For example, in some cases, the traffic congestion level is associated with a given discrete state, such as "high congestion", "medium congestion", and "low congestion." In other cases, the traffic congestion level could be given as a percentage between 0% and 100% or a value in the range between 1 and 10. In the embodiments discussed herein, the traffic congestion level can be a variable stored at the memory 206 and/or the disk 208 that is set to a value as determined by the processor 204 for use with the methods and systems discussed herein.

In one embodiment, if the string stability level is unstable, the processor 204 calculates the traffic congestion level to be high. If the string stability level is stable, the processor 204 calculates the traffic congestion level to be low. Referring to the illustrative example discussed above, if the if the leading vehicle 112 abruptly decelerates and the deceleration of other vehicles in the platoon of vehicles 124 (e.g., the preceding vehicle 106) increases as the distance to the host vehicle 104 decreases, the string stability of the platoon of vehicles is unstable and the vehicles ahead of the host vehicle 104 are close to one another, thus the traffic congestion level is high.

Accordingly, at block 412 the method 400 includes controlling one or more of the vehicle systems 214 of the host vehicle 104 based on the traffic congestion level. For example, in one embodiment, the processor 204 can control the interface system 218 to provide a visual, audible, or tactile indication of the traffic congestion level. For example, a graphic can be generated based on the traffic congestion level and displayed on the HMI 314. The graphic can provide real-time feedback of the traffic congestion level. For example, if the traffic congestion level is high, the graphic can be presented in a red color. If the traffic congestion level is low, the graphic can be presented in a green color. In some embodiments, the control provided at block 412 is a function of the traffic congestion level. Thus, for example, the intensity of the feedback provided on the HMI 314 can vary as a function of the traffic congestion level.

Figure 5:
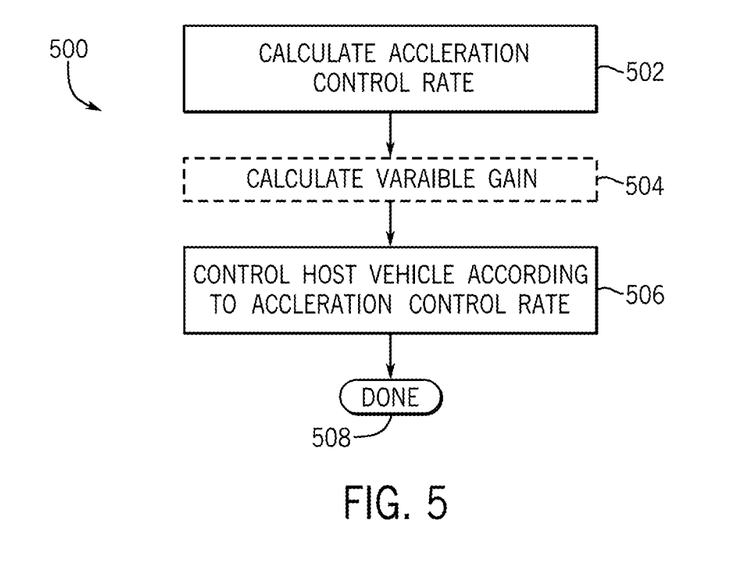
FIG. 5 is a process flow diagram of a method for controlling a host vehicle by calculating an acceleration control rate according to an exemplary embodiment.

In other embodiments, the processor 204 can provide automatic control of the host vehicle 104, for example, longitudinal motion control based on the traffic congestion level. Referring now to FIG. 5, a method 500 for controlling the host vehicle 104 by calculating an acceleration control rate according to an exemplary embodiment is shown. At block 502, the method 500 includes calculating an acceleration control rate of the host vehicle 104, for example, based on the speed data of the preceding vehicle 106 and the speed data of the leading vehicle 112. In one embodiment, the acceleration control rate is based on one or more of a relative distance between the host vehicle 104 and the preceding vehicle 106 with respect to a headway distance, a relative velocity between the host vehicle 104 and the preceding vehicle 106, an acceleration of the preceding vehicle 106, and an acceleration of the leading vehicle 112.

The relative distance between the host vehicle 104 and the preceding vehicle 106 can be based on sensed remote vehicle data 304 about the preceding vehicle 106 (e.g., distance data) and host vehicle data 306. The headway distance is a desired separation (e.g., distance) between the host vehicle 104 and the preceding vehicle 106. The headway reference distance can be predetermined and stored, for example at the memory 206. The relative velocity between the host vehicle 104 and the preceding vehicle 106 can also be based on sensed remote vehicle data 304 about the preceding vehicle 106 (e.g., a velocity of the preceding vehicle 106) and host vehicle data 306 (e.g., a velocity of the host vehicle 104). As discussed above, the acceleration of the preceding vehicle 106 is determined based on sensed remote vehicle data 304 about the preceding vehicle 106. Further, the acceleration of the leading vehicle 112 is received by the host vehicle 104 via V2V communication from the leading vehicle 112. Accordingly, in one embodiment, the processor 204 can calculate the acceleration control rate for the host vehicle 104 according to the following equation:

$$a_{ref} = K_p(x_{i-1} - x_i - h\dot{x}_i - L_{PV}) + K_v(v_{i-1} - v_i) + (K_{a_{pv}} \cdot a_{i-1} + K_{dsrc} \cdot a_L) \quad (5)$$

where $x_{i-1}$ is a distance from a rear end of the host vehicle 104 to the front end of the preceding vehicle 106, $x_i$ is a length of the host vehicle 104, $h\dot{x}_i$ is a pre-determined headway reference distance, $L_{PV}$ is the length of the preceding vehicle 106, is a velocity of the preceding vehicle 106, $v_i$ is the velocity of the host vehicle 104, $a_{i-1}$ is an acceleration rate of the preceding vehicle 106 detected by the sensor system 216, and $a_L$ is an acceleration rate of the leading vehicle 112 received by the host vehicle 104 from the leading vehicle 112 using DSRC via the vehicle communication network 200.

Further, as shown in equation (5), the acceleration control rate can be calculated based on different variable gains, including, a vehicle velocity dynamic gain coefficient $K_p$, a vehicle speed dynamic gain coefficient $K_v$, a preceding vehicle acceleration dynamic gain coefficient $K_{a_{pv}}$, and a leading vehicle acceleration dynamic gain coefficient $K_{dsrc}$. Thus, in one embodiment, the acceleration control rate can be calculated based on the speed data of the preceding vehicle 106, the speed data of the leading vehicle 112, and the variable gain. As will now be described in more detail, the variable gain is the leading vehicle acceleration dynamic gain coefficient $K_{dsrc}$.

In one embodiment, a variable gain for calculating the acceleration control rate can be calculated at block 504. Specifically, a variable gain associated with speed data of the leading vehicle 112 can be calculated based on the string stability level determined at block 408 of FIG. 4. Thus, in one embodiment, the leading vehicle acceleration dynamic gain coefficient $K_{dsrc}$ is calculated based on the string stability level. The processor 204 can modify the acceleration control rate of the host vehicle 104 using the variable gain. More specifically, the acceleration rate of the leading vehicle 112 received via V2V communication can be modified according to the variable gain as shown in equation (5). In one embodiment, the variable gain varies as a function of the string stability level. Thus, as the string stability level increases (e.g., indicating an unstable level), the variable gain increases.

At block 506, the method 500 includes controlling the host vehicle 104 by controlling motion of the host vehicle 104 according to the acceleration control rate. For example, the acceleration control rate can be output by the C-ACC control system 202 in order to control one or more vehicle systems 214 according to the acceleration control rate. Said differently, the vehicle systems 214 are controlled to achieve the acceleration control rate based in part on the current acceleration of the host vehicle 104. Thus, the C-ACC control system 202 can begin to automatically decelerate or accelerate the host vehicle 104 based on the acceleration control rate by controlling the brake actuator 310 and/or the throttle actuator 312. For example, C-ACC control system 202 can set the target acceleration control rate of the C-ACC control system 202 to the acceleration control rate that is calculated at block 506. Based on the current acceleration rate of the host vehicle 104, the C-ACC control system 202 can generate a control signal to achieve the target acceleration control rate. The control signal can be sent to the brake actuator 310 and/or the throttle actuator 312 for execution according to the control signal to achieve the target acceleration control rate.

Alternatively or simultaneously, with acceleration and/or braking of the host vehicle 104, controlling one or more of the vehicle systems 214 of the host vehicle 104 can include controlling the interface system 218, as mentioned above. For example, the C-ACC control system 202 can generate information, suggestions, warnings, and/or alerts and provide the same to a driver on the HMI 314. In other embodiments, tactile feedback can be provided according to the acceleration control rate. Accordingly, the host vehicle 104 can anticipate traffic congestion in the platoon of vehicles 124 as described above, and automatic control of the host vehicle 104 based on the traffic congestion provides a smoother C-ACC experience with early vehicle control.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed herein.

The invention claimed is:

1. A computer-implemented method for controlling a host vehicle in relation to a leading vehicle, and a preceding vehicle, wherein the host vehicle, the leading vehicle, and the preceding vehicle are within a platoon of vehicles, comprising:
  receiving speed data of the leading vehicle from the leading vehicle via a vehicle communication network, wherein the leading vehicle is positioned ahead of the host vehicle and the preceding vehicle;
  receiving speed data of the preceding vehicle from a sensor system of the host vehicle, wherein the preceding vehicle is positioned immediately ahead of the host vehicle;
  calculating a transfer function between the leading vehicle and the host vehicle as a correlation between the speed data of the leading vehicle and the speed data of the preceding vehicle;
  determining a string stability level of the platoon of vehicles based on the transfer function, wherein the string stability level indicates a speed variation of the platoon of vehicles;
  calculating a traffic congestion level based on the string stability level; and controlling a vehicle system of the host vehicle based on the traffic congestion level.

2. The computer-implemented method of claim 1, wherein the speed data of the preceding vehicle is a velocity of the preceding vehicle, and the speed data of the leading vehicle is a velocity of the leading vehicle.

3. The computer-implemented method of claim 2, wherein the transfer function between the leading vehicle and the host vehicle is the correlation between the velocity of the preceding vehicle and the velocity of the leading vehicle.

4. The computer-implemented method of claim 1, wherein the platoon of vehicles is a line of vehicles on a road including the host vehicle, the preceding vehicle, one or more remote vehicles, and the leading vehicle, wherein the leading vehicle is at a foremost position of the platoon of vehicles.

5. The computer-implemented method of claim 1, including calculating an acceleration control rate of the host vehicle based on the speed data of the preceding vehicle and the speed data of the leading vehicle.

6. The computer-implemented method of claim 5, wherein controlling the vehicle system of the host vehicle includes controlling the vehicle system according to the acceleration control rate to control motion of the host vehicle.

7. The computer-implemented method of claim 1, including calculating a variable gain based on the string stability level.

8. The computer-implemented method of claim 7, including calculating an acceleration control rate of the host vehicle is based on the speed data of the preceding vehicle, the speed data of the leading vehicle, and the variable gain.

9. A vehicle control system for controlling a host vehicle in relation to a leading vehicle, and a preceding vehicle, wherein the host vehicle, the leading vehicle, and the preceding vehicle are within a platoon of vehicles, comprising:
    a wireless transceiver of the host vehicle to receive speed data of the leading vehicle from the leading vehicle via a vehicle communication network, wherein the leading vehicle is positioned ahead of the host vehicle and the preceding vehicle;
    a sensor system of the host vehicle for sensing speed data of the preceding vehicle, wherein the preceding vehicle is positioned immediately ahead of the host vehicle; and
    a processor operatively connected for computer communication to the sensor system and the wireless transceiver, wherein the processor:
    calculates a transfer function between the leading vehicle and the host vehicle as a ratio between an input of the leading vehicle and an output of the preceding vehicle, wherein the input of the leading vehicle is based on the speed data of the leading vehicle and the output of the preceding vehicle is based on the speed data of the preceding vehicle;
    determines a string stability level based on the transfer function over a period of time;
    calculates a traffic congestion level based on the string stability level; and
    controls the host vehicle based on the traffic congestion level.

10. The vehicle control system of claim 9, wherein the speed data of the preceding vehicle is a velocity of the preceding vehicle, and the speed data of the leading vehicle is a velocity of the leading vehicle.

11. The vehicle control system of claim 10, wherein the transfer function is the ratio between the input of the leading vehicle and the output of the preceding vehicle, and the input of the leading vehicle is the velocity of the leading vehicle and the output of the preceding vehicle is the velocity of the preceding vehicle.

12. The vehicle control system of claim 9, wherein the platoon of vehicles has a low penetration of vehicle-to-vehicle communication capability.

13. The vehicle control system of claim 9, wherein the processor calculates an acceleration control rate of the host vehicle based on the speed data of the preceding vehicle and the speed data of the leading vehicle.

14. The vehicle control system of claim 13, wherein the processor modifies the acceleration control rate of the host vehicle with a variable gain, wherein the variable gain is based on the string stability level.

15. The vehicle control system of claim 13, wherein the processor control the host vehicle by controlling motion of the host vehicle according to the acceleration control rate.

16. A non-transitory computer-readable storage medium for controlling a host vehicle in relation to a leading vehicle, and a preceding vehicle, wherein the host vehicle, the leading vehicle, and the preceding vehicle are within a platoon of vehicles, including instructions that when executed by a processor, cause the processor to:
    receive speed data of the leading vehicle from the leading vehicle via a vehicle communication network, wherein the leading vehicle is positioned ahead of the host vehicle and the preceding vehicle;
    receive speed data of the preceding vehicle from a sensor system of the host vehicle, wherein the preceding vehicle is positioned immediately ahead of the host vehicle;
    calculate a transfer function between the leading vehicle and the host vehicle as a correlation between the speed data of the leading vehicle and the speed data of the preceding vehicle;
    determine a string stability level of the platoon of vehicles based on the transfer function, wherein the string stability level indicates a speed variation of the platoon of vehicles;
    calculate a traffic congestion level based on the string stability level; and
    control a vehicle system of the host vehicle based on the traffic congestion level.

17. The non-transitory computer-readable storage medium of claim 16, wherein the transfer function between the leading vehicle and the host vehicle is the correlation between a velocity of the preceding vehicle and a velocity of the leading vehicle.

18. The non-transitory computer-readable storage medium of claim 16, wherein the processor calculates an acceleration control rate of the host vehicle based on the speed data of the preceding vehicle and the speed data of the leading vehicle.

19. The non-transitory computer-readable storage medium of claim 16, wherein the processor calculates a variable gain based on the string stability level.

20. The non-transitory computer-readable storage medium of claim 19, wherein the processor calculates an acceleration control rate of the host vehicle based on the speed data of the preceding vehicle, the speed data of the leading vehicle, and the variable gain.

* * * * *